March 5, 1940.  E. E. W. BUTT  2,192,867
POWER UNIT FOR MOTORCYCLES
Filed Aug. 20, 1938  2 Sheets-Sheet 1

March 5, 1940.  E. E. W. BUTT  2,192,867
POWER UNIT FOR MOTORCYCLES
Filed Aug. 20, 1938  2 Sheets-Sheet 2

Inventor:- Ernest Edwin Wallington Butt.
Per:- George E. Folke
Attorney.

Patented Mar. 5, 1940

2,192,867

UNITED STATES PATENT OFFICE 2,192,867

POWER UNIT FOR MOTORCYCLES

Ernest Edwin Wallington Butt, London, England

Application August 20, 1938, Serial No. 225,843
In Great Britain August 23, 1937

2 Claims. (Cl. 180—33)

This invention relates to power units for lightweight motorcycles, and has for its object to provide a power unit for this purpose which is particularly compact and efficient in use.

According to the primary feature of the invention the power unit comprises, in combination, an inverted internal-combustion engine having the cylinder or cylinders disposed beneath the crank casing, a clutch housing extending laterally from said crank casing, a clutch mechanism within said clutch housing, a shaft housing extending axially from said clutch housing, a driven shaft mounted within said shaft housing, a worm on said driven shaft, a pedal crank spindle housing provided integrally on the underside of said shaft housing, a pedal crank spindle mounted within said pedal crank spindle housing, a rotatable sleeve surrounding said pedal crank spindle, a worm-wheel on said sleeve and within said pedal crank spindle housing in driven engagement with said worm, and a sprocket wheel on said sleeve adapted to transmit the engine power to the driving wheel of a motorcycle.

According to a secondary feature of the invention the power unit further comprises a silencer extending laterally from the cylinder part of said inverted internal-combustion engine, beneath and in compact relation to said clutch housing, shaft housing, and pedal crank spindle housing.

According to a tertiary feature of the invention the power unit still further comprises a transmission mechanism associated with said pedal crank spindle for transmitting an auxiliary pedal-controlled drive, and a simple and effective braking mechanism incorporated in said transmission mechanism.

In order that the invention may be clearly understood and readily carried into practice, reference may be had to the accompanying explanatory drawings, in which.

Figure 1:
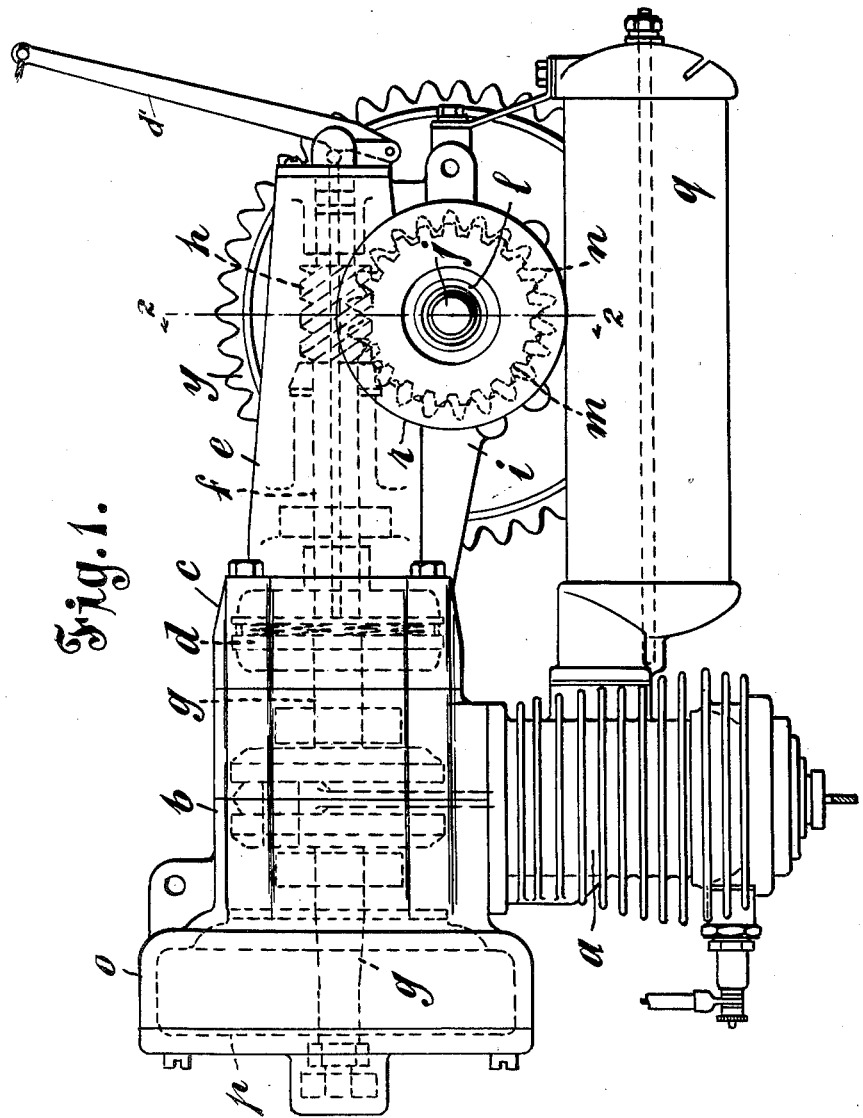
Fig. 1 is a side elevation of the improved power unit.
Figure 2:
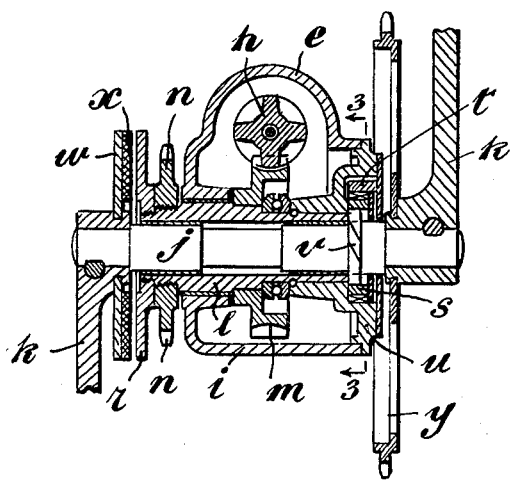
Fig. 2 is a cross-sectional elevation of the same, on a plane indicated by the line 2—2 in Fig. 1.
Figure 3:
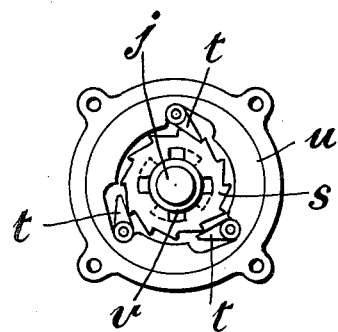
Fig. 3 is a side elevation of certain parts of the transmission mechanism shown in Fig. 2, the view being taken on a plane indicated by the line 3—3 in Fig. 2.

In the illustrated method of carrying the invention into effect, for the production of a power unit designed to be bolted to the frame of a motorcycle in a position forward of the bottom bracket and to be geared to the rear wheel of the motorcycle, the engine of the power unit is of a single-cylinder two-stroke inverted type, with the cylinder $a$ disposed beneath the crank casing $b$. A clutch housing $c$ enclosing the clutch mechanism $d$ operated by lever $d'$ extends laterally from one side of the crank casing $b$, and a shaft housing $e$ extends axially from the clutch housing $c$, this shaft housing $e$ being of an outwardly tapering form and enclosing a driven shaft $f$ disposed in alignment with the crank shaft $g$ and carrying a worm $h$. On the underside of the shaft housing $e$ is formed integrally a housing $i$ for a pedal crank spindle $j$ fitted with the usual pair of pedal cranks $k$, this spindle $j$ being enclosed within a rotatable sleeve $l$, driven by a worm wheel $m$ thereon in gear with the worm $h$, and the sleeve $l$ carrying also a sprocket wheel $n$ adapted to transmit the engine power to the rear wheel of the motorcycle. Extending laterally from the crank casing $b$, on the side opposite the clutch housing $c$, is a magneto housing $o$ enclosing the magneto mechanism $p$, and extending laterally from the cylinder $a$ of the inverted engine is a silencer $q$, this being provided as an entirely separate entity, located beneath and in close relation to the clutch housing $c$, the shaft housing $e$, and the pedal crank spindle housing $i$, so that a particularly compact location and assembly of the primary elements of the power unit is obtained.

With the pedal crank spindle $j$ is associated a transmission mechanism for transmitting an auxiliary pedal-controlled drive to the motorcycle, in conjunction with a braking mechanism incorporated in this transmission mechanism. For this purpose the sleeve $l$ carries a brake disc $r$ at the end adjacent the sprocket wheel $n$, and carries at the opposite end a one-way clutch ring $s$ which co-operates with a plurality of pawls $t$ carried by a fixed annular closure member $u$ which also provides a bearing for the adjacent end of the sleeve $l$. The clutch ring $s$ is internally skew-splined to co-operate with an externally skew-cut gear wheel $v$ fixed on the spindle $j$, which at its opposite end carries on the corresponding pedal crank $k$ a second brake disc $w$ and a friction disc $x$ co-operating with the brake disc $r$ on the sleeve $l$. The pedal crank $k$ at the end of the spindle $j$ adjacent the clutch ring $s$ carries a chain wheel $y$ which is also adapted to be geared to the rear wheel of the motorcycle.

When the auxiliary drive is brought into operation by a forward rotation of the pedal cranks $k$ to assist the engine, the clutch ring $s$ and the skew-cut gear wheel $v$ revolve with the pedal crank spindle $j$, the pawls $t$ being inoperative, whereas on a backward movement being imparted to the pedal cranks *k* the spindle *j* is axially displaced by means of the skew-cut wheel *v*, inasmuch as the clutch ring *s* which is splined thereon engages with the pawls *t* and thereby prevents backward rotation of the clutch ring *s*, said axial displacement of the spindle *j* bringing the brake disc *w* and friction disc *x* on the spindle *j* into engagement with the complementary brake disc *r* on the sleeve *l*, and thereby effecting the required braking action.

I claim:

1. The combination with a motorcycle power unit comprising an internal combustion engine, a clutch housing and shaft housing, with a clutch and shaft in the corresponding housing; of a pedal crank spindle housing provided integrally on the underside of said shaft housing, a pedal crank spindle mounted within said pedal crank spindle housing, a rotatable sleeve surrounding said pedal crank spindle, a worm-wheel on said sleeve and within said pedal crank spindle housing in driven engagement with a worm on the shaft in the shaft housing, a sprocket wheel on said sleeve adapted to transmit the engine power to the driving wheel of a motorcycle, a transmission mechanism associated with said pedal crank spindle for transmitting an auxiliary pedal-controlled drive, and a braking mechanism incorporated in said transmission mechanism.

2. The combination with a motorcycle power unit comprising an internal combustion engine, a clutch housing and shaft housing, with a clutch and shaft in the corresponding housing; of a pedal crank spindle housing provided integrally on the underside of said shaft housing, a pedal crank spindle mounted within said pedal crank spindle housing, a rotatable sleeve surrounding said pedal crank spindle, a worm-wheel on said sleeve and within said pedal crank spindle housing in driven engagement with a worm on the shaft in the shaft housing, a sprocket wheel on said sleeve adapted to transmit the engine power to the driving wheel of a motorcycle, an externally skew-cut gear wheel fixed on the pedal crank spindle at the end remote from the sprocket wheel, a one-way clutch ring carried by the sleeve and internally skew-splined to co-operate with the skew-cut wheel, a fixed annular closure for the end of the pedal crank spindle housing, a plurality of pawls carried by the closure in co-operation with the clutch ring, a chain wheel on the spindle adapted to transmit auxiliary power to the driving wheel of the motorcycle when the spindle is forwardly rotated by pedal action, a brake disc on the sleeve at the end adjacent the sprocket, and a brake disc and friction disc on the spindle in co-operation with the brake disc on the sleeve, the skew-cut wheel being operative to displace the pedal crank spindle axially and effect the braking action when the spindle is backwardly rotated by pedal action.

ERNEST EDWIN WALLINGTON BUTT.